US011864106B2

(12) United States Patent
Yun et al.

(10) Patent No.: US 11,864,106 B2
(45) Date of Patent: Jan. 2, 2024

(54) ELECTRONIC DEVICE UTILIZING LOW POWER WIRELESS COMMUNICATION AND METHOD THEREOF

(71) Applicant: Samsung Electronics Co., Ltd., Gyeonggi-do (KR)

(72) Inventors: Yongseob Yun, Gyeonggi-do (KR); Sungkwang Yang, Gyeonggi-do (KR); Juhwan Yun, Gyeonggi-do (KR); Junghun Lee, Gyeonggi-do (KR); Junsu Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 17/241,215

(22) Filed: Apr. 27, 2021

(65) Prior Publication Data
US 2021/0345243 A1 Nov. 4, 2021

(30) Foreign Application Priority Data
May 4, 2020 (KR) .......................... 10-2020-0053365

(51) Int. Cl.
*H04W 52/02* (2009.01)
*H04W 76/10* (2018.01)
(Continued)

(52) U.S. Cl.
CPC ...... *H04W 52/0216* (2013.01); *H04B 1/3883* (2013.01); *H04W 28/0268* (2013.01);
(Continued)

(58) Field of Classification Search
CPC ......... H04W 52/0216; H04W 28/0268; H04W 52/0235; H04W 76/10; H04W 84/12;
(Continued)

(56) References Cited

U.S. PATENT DOCUMENTS

| 8,203,985 B2 | 6/2012 | Gong et al. |
| 8,965,351 B2 | 2/2015 | Damola et al. |

(Continued)

FOREIGN PATENT DOCUMENTS

| KR | 10-2011-0076030 A | 7/2011 |
| KR | 10-2013-0052895 A | 5/2013 |

(Continued)

OTHER PUBLICATIONS

International Search Report dated Aug. 4, 2021.

*Primary Examiner* — Ashley Shivers
(74) *Attorney, Agent, or Firm* — Cha & Reiter, LLC

(57) ABSTRACT

In accordance with an aspect of the disclosure, an electronic device comprises a wireless communication circuit; and at least one processor operatively connected to the wireless communication circuit, wherein the at least one processor is configured to: establish a communication channel with an external electronic device by using the wireless communication circuit; determine a duration of a data communication time period based on a frame rate of content, wherein the data communication time period comprises an active time period and a sleep time period; control the wireless communication circuit to enter an active state during the active time period; communicate data with the external electronic device through the communication channel during the active time period; and control the wireless communication circuit to enter a sleep state in a sleep time period.

20 Claims, 9 Drawing Sheets

(51) Int. Cl.
*H04W 28/02* (2009.01)
*H04B 1/3883* (2015.01)
*H04W 84/12* (2009.01)

(52) U.S. Cl.
CPC ....... *H04W 52/0235* (2013.01); *H04W 76/10* (2018.02); *H04W 84/12* (2013.01)

(58) Field of Classification Search
CPC .............. H04W 76/27; H04W 52/0261; H04B 1/3883; Y02D 30/70; G02B 27/017; H02J 7/0045
See application file for complete search history.

(56) References Cited

U.S. PATENT DOCUMENTS

| | | | |
|---|---|---|---|
| 8,984,304 | B2 | 3/2015 | Zimmerman |
| 9,100,916 | B2 | 8/2015 | Cho |
| 9,282,297 | B2 | 3/2016 | Siann et al. |
| 9,661,572 | B2 | 5/2017 | Damola et al. |
| 9,883,457 | B2 | 1/2018 | Zimmerman |
| 9,895,606 | B1 | 2/2018 | Kamata et al. |
| 10,220,309 | B2 | 3/2019 | Kamata et al. |
| 10,575,252 | B2 | 2/2020 | Damola et al. |
| 10,687,028 | B2 | 6/2020 | Siann et al. |
| 10,743,256 | B2 | 8/2020 | Damola et al. |
| 10,881,952 | B2 | 1/2021 | Kamata et al. |
| 10,912,130 | B2 | 2/2021 | Park et al. |
| 2009/0125735 | A1 | 5/2009 | Zimmerman |
| 2009/0189981 | A1 | 7/2009 | Siann et al. |
| 2010/0165896 | A1 | 7/2010 | Gong et al. |
| 2011/0096168 | A1 | 4/2011 | Siann et al. |
| 2013/0124894 | A1 | 5/2013 | Cho |
| 2015/0139060 | A1 | 5/2015 | Damola et al. |
| 2015/0195784 | A1 | 7/2015 | Zimmerman |
| 2016/0050712 | A1* | 2/2016 | Kim .................. H04W 52/0287 370/311 |
| 2016/0173833 | A1 | 6/2016 | Siann et al. |
| 2017/0171812 | A1* | 6/2017 | Guo .................. H04W 52/0212 |
| 2017/0322622 | A1* | 11/2017 | Hong ...................... G06F 3/041 |
| 2018/0193732 | A1 | 7/2018 | Kamata et al. |
| 2019/0041976 | A1* | 2/2019 | Veeramani .............. G06F 3/011 |
| 2019/0176029 | A1 | 6/2019 | Kamata et al. |
| 2019/0357277 | A1 | 11/2019 | Park et al. |
| 2020/0244930 | A1 | 7/2020 | Siann et al. |
| 2020/0322885 | A1 | 10/2020 | Damola et al. |
| 2021/0077901 | A1 | 3/2021 | Kamata et al. |
| 2021/0127158 | A1 | 4/2021 | Choi et al. |

FOREIGN PATENT DOCUMENTS

| | | | |
|---|---|---|---|
| KR | 10-1537895 B1 | 7/2015 | |
| WO | 2009-064439 A2 | 5/2009 | |
| WO | WO-2015108225 A1 * | 7/2015 | ........... G02B 27/017 |

* cited by examiner

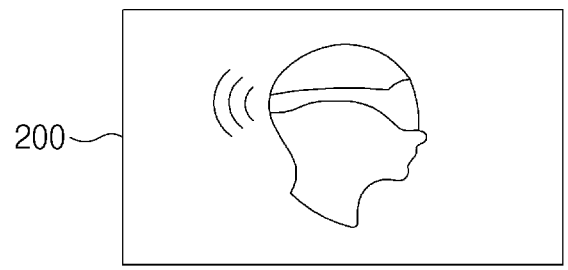
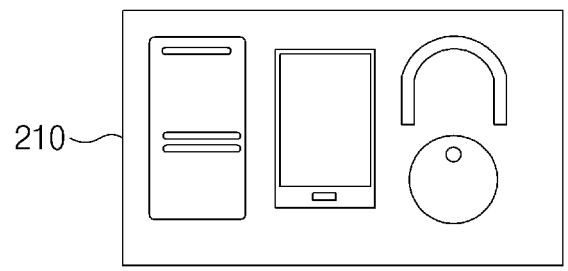
FIG.2

| Rx CONTENT bitrate | 1ms (6%) | 2ms (12%) | 4ms (24%) | 8ms (48%) | 16ms (96%) | |
|---|---|---|---|---|---|---|
| 10Mbps | 166.7Mbps | 83.3Mbps | 41.7Mbps | 20.8Mbps | 10Mbps | MINIMUM REQUIRED THROUGHPUT |
| | 15 mW | 30 mW | 61 mW | 122 mW | 243 mW | POWER CONSUMPTION |
| 50Mbps | 833.3Mbps | 416.7Mbps | 208.3Mbps | 104.2Mbps | 50Mbps | MINIMUM REQUIRED THROUGHPUT |
| | 27 mW | 34 mW | 59 mW | 117 mW | 234 mW | POWER CONSUMPTION |
| 100Mbps | N/A | 833.3Mbps | 416.7Mbps | 208.3Mbps | 100Mbps | MINIMUM REQUIRED THROUGHPUT |
| | | 53 mW | 68 mW | 117 mW | 234 mW | POWER CONSUMPTION |
| 500Mbps | N/A | N/A | N/A | 1,041Mbps | 500Mbps | MINIMUM REQUIRED THROUGHPUT |
| | | | | 213 mW | 274 mW | POWER CONSUMPTION |
| 1Gbps | N/A | N/A | N/A | N/A | 1,000Mbps | MINIMUM REQUIRED THROUGHPUT |
| | | | | | 425 mW | POWER CONSUMPTION |
| 2Gbps | N/A | N/A | N/A | N/A | N/A | |

600

| Tx CONTENT bitrate | 1ms (6%) | 2ms (12%) | 4ms (24%) | 8ms (48%) | 16ms (96%) | |
|---|---|---|---|---|---|---|
| 10Mbps | 166.7Mbps | 83.3Mbps | 41.7Mbps | 20.8Mbps | 10Mbps | MINIMUM REQUIRED THROUGHPUT |
| | 57 mW | 113 mW | 236 mW | 453 mW | 905 mW | POWER CONSUMPTION |
| 50Mbps | 833.3Mbps | 416.7Mbps | 208.3Mbps | 104.2Mbps | 50Mbps | MINIMUM REQUIRED THROUGHPUT |
| | 97 mW | 113 mW | 236 mW | 453 mW | 905 mW | POWER CONSUMPTION |
| 100Mbps | N/A | 833.3Mbps | 416.7Mbps | 208.3Mbps | 100Mbps | MINIMUM REQUIRED THROUGHPUT |
| | | 193 mW | 236 mW | 453 mW | 905 mW | POWER CONSUMPTION |
| 500Mbps | N/A | N/A | N/A | 1,041Mbps | 500Mbps | MINIMUM REQUIRED THROUGHPUT |
| | | | | 772 mW | 905 mW | POWER CONSUMPTION |
| 1Gbps | N/A | N/A | N/A | N/A | 1,000Mbps | MINIMUM REQUIRED THROUGHPUT |
| | | | | | 1545 mW | POWER CONSUMPTION |
| 2Gbps | N/A | N/A | N/A | N/A | N/A | |

ELECTRONIC DEVICE UTILIZING LOW POWER WIRELESS COMMUNICATION AND METHOD THEREOF

CROSS-REFERENCE TO RELATED APPLICATION(S)

This application is based on and claims priority under 35 U.S.C. § 119 to Korean Patent Application No. 10-2020-0053365, filed on May 4, 2020, in the Korean Intellectual Property Office, the disclosure of which is incorporated by reference herein its entirety.

BACKGROUND

1. Field

The disclosure relates to an electronic device for wireless communication, and more particularly, relates to a device and method for reducing power consumption upon performing data communication with an external electronic device.

2. Description of Related Art

The use of an augmented reality (AR)/virtual reality (VR) device is increasing. The AR/VR device may be composed of a head mount display (HMD) and an external electronic device (e.g., a smartphone or an auxiliary device).

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device comprises a wireless communication circuit; and at least one processor operatively connected to the wireless communication circuit, wherein the at least one processor is configured to: establish a communication channel with an external electronic device by using the wireless communication circuit; determine a duration of a data communication time period based on a frame rate of content, wherein the data communication time period comprises an active time period and a sleep time period; control the wireless communication circuit to enter an active state during the active time period; communicate data with the external electronic device through the communication channel during the active time period; and control the wireless communication circuit to enter a sleep state in a sleep time period.

In accordance with an aspect of the disclosure, an operating method of an electronic device comprises: establishing a communication channel with an external electronic device using a wireless communication circuit; determining a data communication time period based on a frame rate of a content, wherein the data communication time period comprises an active time period and a sleep time period; control the wireless communication circuit to an active state in the active time period; performing data communication with the external electronic device through the communication channel in the active time period; and control the wireless communication circuit to enter a sleep state in a sleep time period.

In accordance with an aspect of the disclosure, a non-transitory computer-readable recording medium stores at least one or more instructions, when executed by at least one processor, causing the at least one processor to perform: establishing a communication channel with an external electronic device by using a wireless communication circuit; determining a data communication time period based on a frame rate of a content, wherein the data communication time period comprises an active time period and a sleep time period; control the wireless communication circuit to an active state in the active time period; performing data communication with the external electronic device through the communication channel in the active time period; and control the wireless communication circuit to enter a sleep state in a sleep time period.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a diagram illustrating an AR/VR device and a communication channel according to certain embodiments;

FIG. 6 is a table obtained by measuring power consumption of an HMD using low-power wireless communication, according to certain embodiments.

DETAILED DESCRIPTION

The HMD processes a large amount of data and performs a lot of calculations to provide a user with video content using a camera and a display. However, due to the limitation of its own computation capability and/or the battery capacity, the HMD may process calculations required to provide content through an external electronic device.

When AR/VR devices were initially distributed, the HMD was connected by a wire to the external electronic device. The wire (e.g., wired tethering) provided fast data communication and continuous power to the HMD. However, when the HMD is used while being connected by wire, the HMD and the external electronic device need to be maintained within a specific distance so that the wire is attached to each of the devices. This causes inconvenience.

Nowadays, the HMD and the external electronic device can be connected wirelessly (e.g., wireless tethering).

An HMD may need to perform communication on a large amount of data to provide high-resolution image content. To this end, there is a need for a communication method for performing communication on a large amount of data with a stable and fast throughput. Accordingly, a method of using wireless fidelity (WiFi) communication capable of supporting a high throughput may be considered.

However, power consumption may increase when the HMD performs data communication by using WiFi communication. When the HMD is not connected to an external power supply, power to the HMD may be limited to the capacity of a built-in battery. To increase an operating time of the HMD, there is a need for a battery having a larger capacity. However, the size and weight of the battery may be limited because the HMD is mounted on a part of the user's body (e.g., a head). The limitations on the size and weight of the battery become especially pronounced when an AR/VR device is used for special purposes such as military activities.

Aspects of the disclosure are to address at least the above-mentioned problems and/or disadvantages and to provide at least the advantages described below. Accordingly, an aspect of the disclosure is to provide a method, in which a HMD is capable of communicating with an external electronic device at low power, to solve the problem of increasing a capacity and size of a battery due to power consumption.

Figure 1:
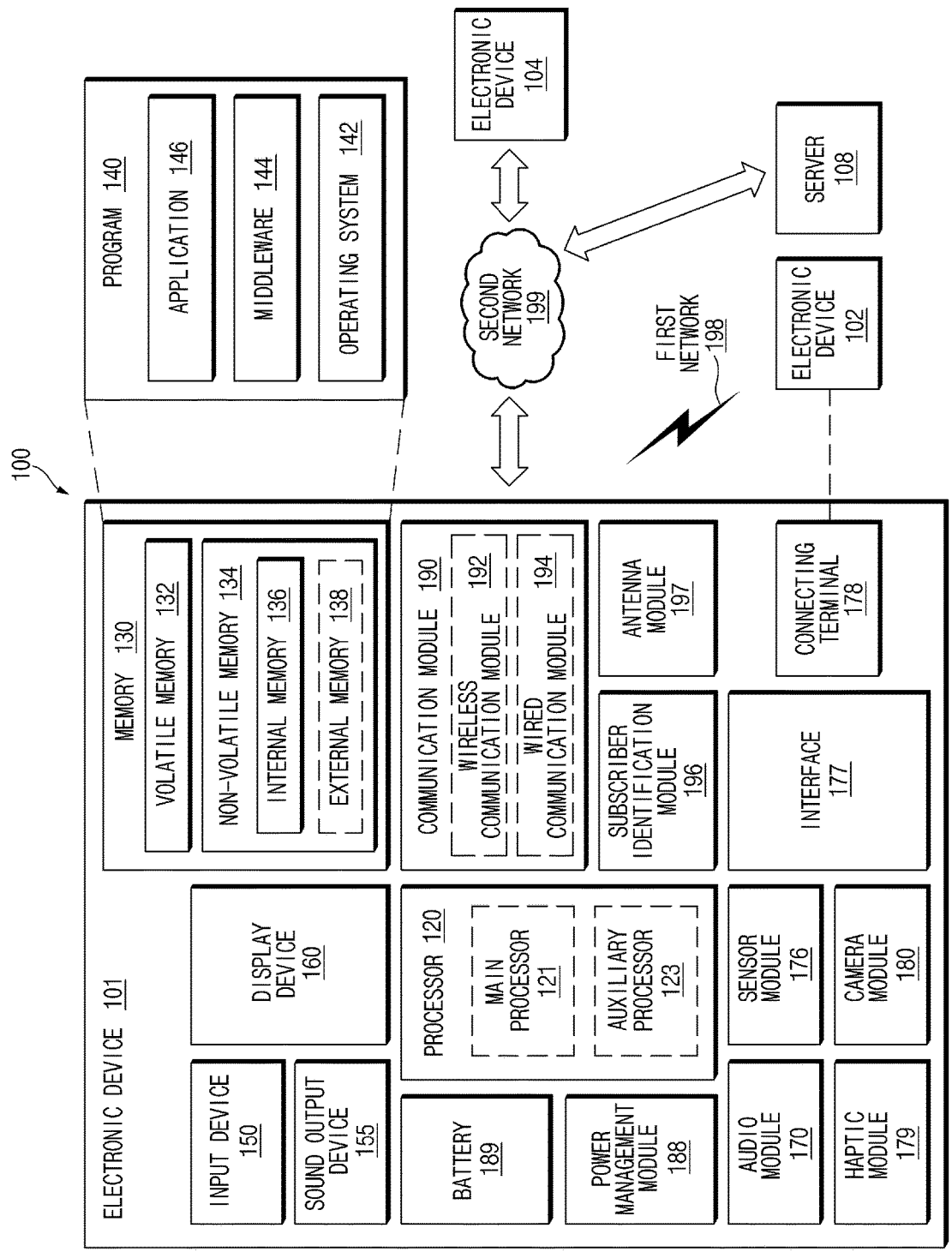
FIG. 1 is a block diagram illustrating an electronic device in a network environment according to certain embodiments.
Figure 3:
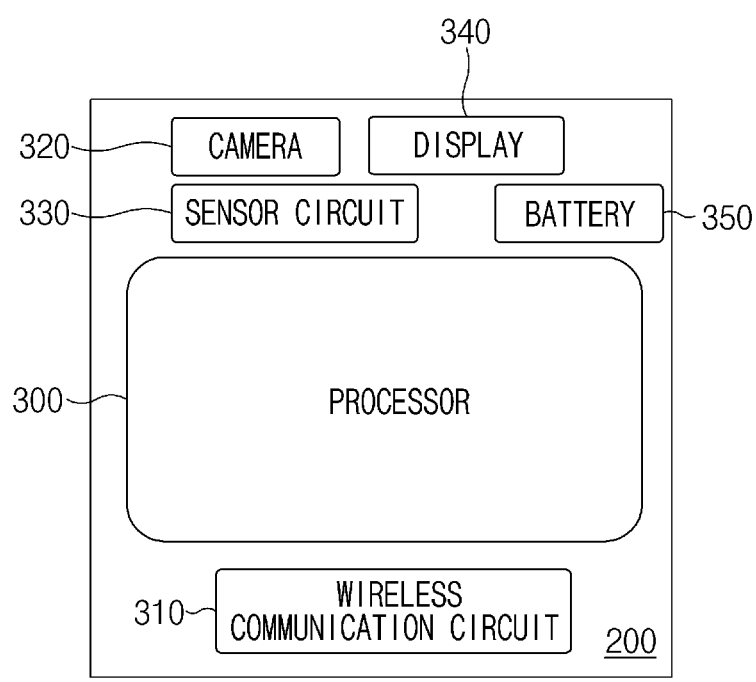
FIG. 3 is a block diagram illustrating components of an HMD according to certain embodiments.

FIG. 1 describes an electronic device 101 in a network environment. The electronic device can be a head-mounted display (HMD). However, due to restrictions associated with mounted the HMD to a body part, an external device may perform certain data processing and calculations and transmit the result to the HMD using a communication channel. FIG. 2 shows an HMD and an external device communicating using a communication channel. FIG. 3 describes the HMD and FIG. 4 describes the external electronic device. When the HMD communicates with the external electronic device using the communication channel, power consumption increases. FIGS. 5A-5C, 6, and 7 describe a method of communication between the HMD and the external electronic device that may reduce power consumption by the HMD.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" as used herein shall refer to both the singular and plural contexts.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Electronic device 101 can comprise a head mounted display (HMD) and electronic device 102 can comprises an external electronic device. Due to restrictions associated with mounting the HMD 101 to the human body, a large amount of data processing and calculations may be offloaded to an external electronic device 102. The HMD 101 and the external electronic device may communicate large amounts of data using a communication channel. The communication channel may include short range wireless communications, including Bluetooth, or WiFi, among others.

FIG. 2 illustrates an HMD 200 communicating with an external electronic device 210 using a communication channel FIG.

HMD and External Electronic Device

FIG. 2 is a diagram illustrating an AR/VR device and a communication channel according to certain embodiments.

According to an embodiment, an AR/VR device may include a HMD 200 (e.g., the electronic device 101 of FIG. 1) and/or an external electronic device 210 (e.g., the electronic device 102 of FIG. 1).

The HMD 200 and the external electronic device 210 may establish a communication channel 230. For example, communication channel 230 may be referred to as "WiFi communication". The external electronic device 210 may support a WiFi wireless tethering function, and the HMD

200 may establish the communication channel 230 based on the WiFi wireless tethering provided by the external electronic device 210.

The HMD 200 may transmit or receive data associated with content with the external electronic device 210 through the communication channel 230. The HMD 200 may provide the content to a user based on the data. For example, in a VR environment, the HMD 200 may provide the user with a virtual environment as video content. The HMD 200 may provide both eyes of the user with different pieces of image content to express the sense of depth and/or reality of a virtual environment. In this case, the amount of data associated with content may be greater than the amount of data in the case where the same video content is provided to both eyes. As another example, in an AR environment, the HMD 200 may allow the user to watch a real environment; and, at the same time, the HMD 200 may overlay an indicator (e.g., graphic object) associated with the real environment on the real environment and then may provide the user with the overlaid result. The user may interact with the AR environment by performing a specific operation on the indicator provided together with the real environment. The HMD 200 may transmit data associated with the user's action to the external electronic device 210 through the communication channel 230 to provide a feedback in response to the user's action.

1. Head Mounted Display

Referring to FIG. 3, FIG. 3 is a block diagram illustrating components of an HMD according to certain embodiments.

According to an embodiment, a HMD (e.g., 200 in FIG. 2) may include a processor 300, a wireless communication circuit 310, a camera 320, a sensor circuit 330, a display 340, and/or a battery 350. The HMD 200 may further include a component not illustrated in FIG. 3 or may not include at least one of the configurations illustrated in FIG. 3. For example, the HMD 200 may not include the camera 320.

The wireless communication circuit 310 (e.g., the communication module 190 of FIG. 1) may communicate with an external electronic device (e.g., 210 of FIG. 2) through a short-range communication network (e.g., the first network 198 of FIG. 1). For example, the short-range communication network may be WiFi communication (e.g., WiFi wireless tethering). The external electronic device 210 may be an electronic device that provides a WiFi wireless tethering function. The HMD 200 may perform data communication with the external electronic device 210 based on the WiFi wireless tethering provided by the external electronic device 210.

The camera 320 (e.g., the camera module 180 of FIG. 1) may capture a still image and a video. According to an embodiment, the camera 320 may include one or more lenses, image sensors, image signal processors, or flashes.

The sensor circuit 330 (e.g., the sensor module 176 of FIG. 1) may detect an external environmental state (e.g., a user state) of the HMD 200 and may generate an electrical signal or a data value corresponding to the detected state. The sensor circuit 330 may measure a direction, orientation, speed, acceleration, and/or acceleration of gravity of a user wearing the HMD 200, by using an accelerometer, a gyroscope, and/or a magnetometer.

The display 340 (e.g., the display device 160 of FIG. 1) may visually provide information to the outside (e.g., a user) of the HMD 200. According to an embodiment, the HMD 200 may further include a lens assembly and a translucent mirror to provide the user with an AR environment. The lens assembly may be configured by stacking a plurality of positive lenses and/or negative lenses. The light of an image provided by the display 340 may pass through the lens assembly, may be reflected by the translucent mirror, and may be provided to the user. The user may watch a real image through the translucent mirror. The HMD 200 may generate an AR environment by providing an image provided by the display 340 on a real image by using the lens assembly. According to another embodiment, the HMD 200 may provide video content to the display 340 to provide a VR environment to a user. The HMD 200 may provide different pieces of image content to both eyes to express the sense of depth and/or reality of a virtual environment. In this case, the display 340 may be designed to display images respectively corresponding to both eyes of the user.

The processor 300 (e.g., the processor 120 of FIG. 1) may be operatively connected to another component of FIG. 3 (e.g., the wireless communication circuit 310, the camera 320, the sensor circuit 330, the display 340, and/or the battery 350). For example, the processor 300 may execute software (e.g., the program 140 of FIG. 1) to control at least another component of the HMD 200 connected to the processor 300, and may process or compute a variety of data. According to an embodiment, the processor 300 may include one or more processors. For example, the processor 300 may include a main processor (e.g., 121 in FIG. 1) and at least one auxiliary processor (e.g., 123 in FIG. 1). The auxiliary processor 123 may perform a function associated with another configuration of the HMD 200, independently of or together with the main processor 121. For example, it may be understood that the auxiliary processor 123 is a communication processor. The auxiliary processor 123 may be configured to be specialized for a function associated with the wireless communication circuit 310, independently or together with the processor 300. For example, the auxiliary processor 123 may control at least part of functions or states associated with the wireless communication circuit 310, instead of the main processor 121 while the main processor 121 is in an inactive (e.g., sleep) state or together with the main processor 121 while the main processor 121 is in an active (e.g., the execution of an application) state. The main processor 121 and/or at least one auxiliary processor 123 may be implemented separately or on one chip. The auxiliary processor 123 (e.g., a communication processor) may be implemented as a part of functionally-related other components (e.g., the wireless communication circuit 310).

According to an embodiment, the HMD 200 may not process the large amounts of data and calculations due to various restrictions, and thus the processing capability of the processor 300 of the HMD 200 may be lower than that of the processor of the external electronic device 210 (e.g., the processor 120 of FIG. 1). For example, the HMD 200 may be equipped with the battery 350 that has a small capacity and a small size. Accordingly, when the processor 300 of the HMD 200 processes a large amount of data and calculations, heat may be generated from the battery 350 of the HMD 200 or the usage time of the HMD 200 may be shortened. Accordingly, it is understood that the processor 300 is a processor (e.g., Lite AP) that is capable of processing a relatively small amount of data and calculations and has relatively-low performance, as compared to the processor of the external electronic device 210.

The processor 300 may provide content to a user by using components of FIG. 3. According to an embodiment, in an AR environment, the processor 300 may receive data associated with content from the external electronic device 210 by using a wireless communication circuit 310. The processor 300 may provide content (e.g., an indicator) based on the data associated with the content by using the display 340 together with a real image. The processor 300 may transmit information about the real image, which the user watches, to the external electronic device 210 to provide the content (e.g., an indicator) to the user.

For example, the processor 300 may obtain data of the real image, which the user watches, by using the camera 320. The processor 300 may transmit the data of the real image to the external electronic device 210 by using the wireless communication circuit 310, and the external electronic device 210 may process the data to generate data associated with content. When the user interacts with the content provided through the HMD 200, the processor 300 may provide the user with a feedback corresponding to the user's action. To the end, the processor 300 may obtain data (e.g., information associated with a movement direction of the user, a moving speed of the user, a gaze direction of the user, and/or a direction of the user's head) associated with the action of the user wearing the HMD 200 by using the sensor circuit 330. The processor 300 may transmit data associated with the user's action to the external electronic device 210 by using the wireless communication circuit 310, and the external electronic device 210 may process the data to generate data associated with content. The processor 300 may receive the data associated with the content by using the wireless communication circuit 310 and may provide the user with the content based on the data.

According to another embodiment, in a VR environment, the processor 300 may receive data associated with content from the external electronic device 210 by using the wireless communication circuit 310. The processor 300 may provide the user with the data associated with the content through the display 340. When the data associated with the content includes different pieces of video content for both eyes, the processor 300 may transmit or receive a greater amount of data with the external electronic device 210 than an amount of data in the AR environment. The processor 300 may provide video content corresponding to the user's action depending on the user's action. For example, the processor 300 may obtain data associated with the action of the user wearing the HMD 200, using the sensor circuit 330. The processor 300 may transmit data associated with the user's action to the external electronic device 210 by using the wireless communication circuit 310, and the external electronic device 210 may process the data to generate data (e.g., the video content corresponding to the user's action) associated with content. The processor 300 may receive data associated with content by using the wireless communication circuit 310 and may provide the content based on the data through the display 340. The battery 350 (e.g., the battery 189 of FIG. 1) may supply power to at least one component (e.g., the processor 300, the wireless communication circuit 310, the camera 320, the sensor circuit 330, and/or the display 340) of the HMD 200. The battery 350 mounted in the HMD 200 using wireless communication may have limitations in size and capacity. The processor 300 may perform only limited calculations in consideration of the limitations of the battery 350, may transmit calculations requiring large power consumption to the external electronic device 210 through the wireless communication circuit 310, and may allow the external electronic device 210 to process the calculations. The processor 300 may receive data processed by the external electronic device 210 by using the wireless communication circuit 310 and then may provide the user with the data as content.

2. External Electronic Device

Figure 4:
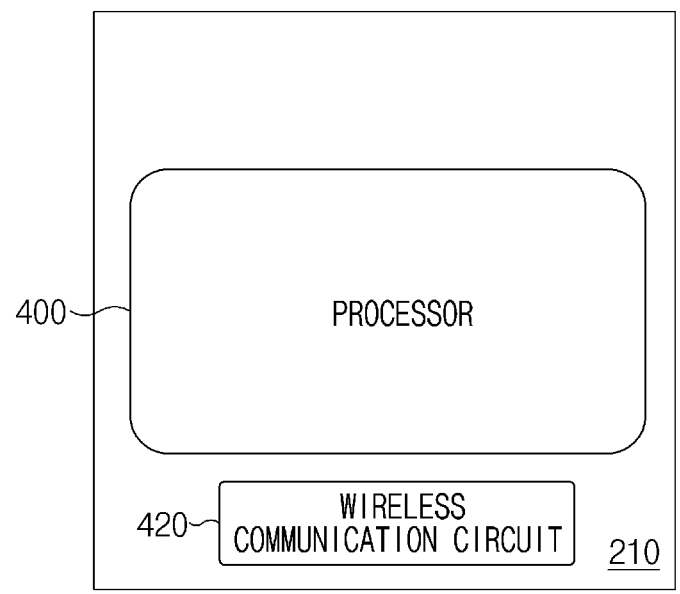
FIG. 4 is a block diagram illustrating components of an external electronic device according to certain embodiments.

Referring to FIG. 4, FIG. 4 is a block diagram illustrating components of an external electronic device according to certain embodiments.

According to an embodiment, an external electronic device (e.g., 210 of FIG. 2) may include a processor 400 and/or a wireless communication circuit 420. For example, the external electronic device 210 may be referred to as a "smart phone" or an "auxiliary device". The auxiliary device may be understood as a device capable of supporting some functions (e.g., a voice output function or a communication function) of a smart phone, and may be understood as an electronic device capable of supporting a wireless tethering function such that another device is capable of accessing a network. For example, the auxiliary device may be referred to as a "computer" and/or a "speaker" that supports a wireless tethering function. According to an embodiment, the external electronic device 210 may further include a configuration not illustrated in FIG. 4. For example, the external electronic device 210 may further include a battery (e.g., the battery 189 of FIG. 1).

According to an embodiment, the external electronic device 210 may be a case capable of keeping the HMD 200. The external electronic device 210 may include a charging terminal capable of connecting the battery of the external electronic device 210 to the HMD 200. The HMD (e.g., 300 in FIG. 3) may be kept in the external electronic device 210, and may be connected to a charging terminal of the external electronic device 210 such that the battery 350 is charged. The external electronic device 210 may perform data communication with the HMD 200 while charging the HMD 200.

The wireless communication circuit 420 (e.g., the wireless communication module 192 of FIG. 1) may identify and authenticate the external electronic device 210 within a communication network, such as a first network (e.g., 198 in FIG. 1) or a second network (e.g., 199 in FIG. 1), by using subscriber information (e.g., international mobile subscriber identity (IMSI)) stored in the subscriber identification module (e.g., 196 in FIG. 1). According to an embodiment, the wireless communication circuit 420 may communicate with the HMD 200 through a short-range communication network. For example, the short-range communication network may be referred to as "WiFi communication". The external electronic device 210 may provide a WiFi wireless tethering function. The external electronic device 210 may be connected to the HMD 200 through WiFi wireless tethering to perform data communication associated with content.

The processor 400 (e.g., the processor 120 of FIG. 1) may be operatively connected to another component (e.g., the wireless communication circuit 210 and/or a battery) of FIG. 4. For example, the processor 400 may execute software (e.g., the program 140 of FIG. 1) to control at least another component of the external electronic device 210 connected to the processor 400, and may process various types of data or calculations.

The processor 400 may receive data from the HMD 200 by using the wireless communication circuit 420. For example, the processor 400 may receive, from the HMD 200, data associated with a user's action and/or data associated with an image obtained by using the camera 320 by the HMD 200. The processor 400 may generate data associated with content by processing data received from the HMD 200. The processor 400 may transmit data associated with content to the HMD 200 by using the wireless communication circuit 420.

The processor 400 of the external electronic device 210 is relatively free from limitations of a battery, and thus the processor 400 of the external electronic device 210 may process data and calculation, which are relatively complex and have a relatively large amount, as compared with the processor 300 of the HMD 200. For example, at least part of calculations associated with content provided by the HMD 200 may be processed by the processor 400 of the external electronic device 210.

Returning to FIG. 2, the HMD 200 may transmit or receive data associated with content with the communication channel 230 through the external electronic device 210. For example, in a VR environment, the data associated with the content may be understood as image data for providing a virtual environment to a user through the display 340 of the HMD 200. As another example, in an AR environment, content may be understood as an indicator capable of being displayed together on a real image that a user is capable of seeing through the HMD 200.

The processor 300 of the HMD 200 may process content-related data and calculation together with the processor 400 of the external electronic device 210. For example, the processor 300 of the HMD 200 may perform vision processing, video decoding, and/or warping. For example, the processor 400 of the external electronic device 210 may perform rendering and/or video encoding for content. A battery capable of being mounted in the HMD 200 may have limitations in capacity. Accordingly, when the processor 300 of the HMD 200 processes a large amount of data and calculations, heat may be generated from the battery 350, or the usage time of the HMD 200 may be shortened. According to an embodiment, the processing of the data and calculations, which are capable of being performed by the processor 300 of the HMD 200, may be relatively simple as compared with the processor 400 of the external electronic device 210. The processing of the data and calculations performed by the HMD 200 and the external electronic device 210 is an example, and an embodiment of the disclosure is not limited thereto.

According to an embodiment, the processor 300 of the HMD 200 needs to stably and quickly transmit or receive a large amount of data with the external electronic device 210 to provide high-resolution video content. Accordingly, it may be understood that the communication channel 230 is a short-range wireless network communication capable of stably supporting a high throughput. For example, the communication channel 230 may be WiFi communication. The external electronic device 210 may provide the HMD 200 with a WiFi wireless tethering function by using the wireless communication circuit 420.

According to an embodiment, the processor 300 of the HMD 200 may establish the communication channel 230 (e.g., WiFi wireless tethering) with the external electronic device 210 by using the wireless communication circuit 310 and may perform data communication associated with content. The WiFi wireless tethering method may be a communication method that has large power consumption while having high throughput, and thus heat may be generated from a battery of the HMD 200, and the usage time of the HMD 200 may be shortened. According to an embodiment, the HMD 200 may establish the communication channel 230 with the external electronic device 210 by using a WiFi wireless tethering method; power consumption may be reduced by restricting a time period in which the wireless communication circuit 310 wakes up for communication. The low-power communication method may be described in detail with reference to FIGS. 5A to 5C.

In certain embodiments, the external electronic device 210 may decompress video and audio that is compressed according to a compression standard, such as a standard from the Motion Picture Experts Group (MPEG). The external electronic device 210 can also perform scaling and provide A/V output for the HMD 200.

Power consumption may increase when the HMD performs data communication by using WiFi communication. When the HMD is not connected to an external power supply, power to the HMD may be limited to the capacity of a built-in battery. Moreover, there may be restrictions on the size and weight of the built-in battery, due to the fact that the HMD is mounted on the user.

Communication Method

Figure 5A:
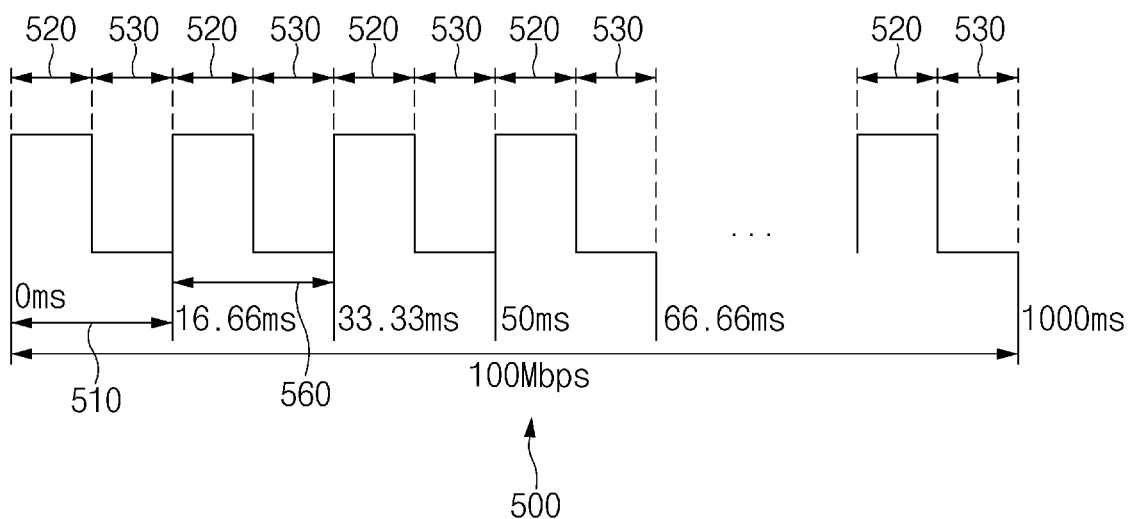
FIGS. 5A to 5C illustrate a low-power communication method of an HMD according to certain embodiments.

The HMD 200 saves power by using a data communication period 510 that comprises an active time period 520 and a sleep time period 530 as illustrated in FIG. 5A. The data communication time period 510, 560 can be based on the frame rate of content transmitted by the external device 210. The HMD 200 communicates with the external device 210 during the active time period 520. During the sleep time period 530, the HMD 200 can enter the sleep state, or place the wireless communication circuit 310 in a sleep state. The foregoing may reduce power consumption.

Figure 5B:
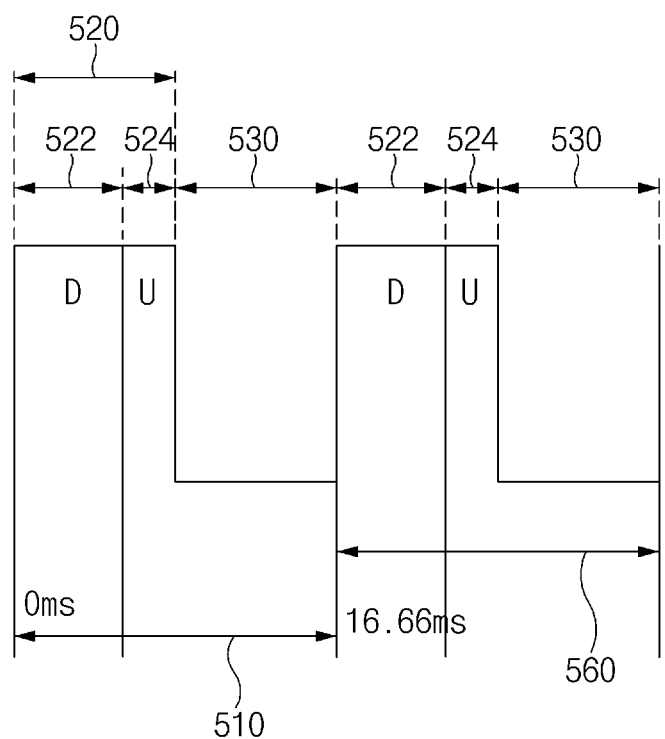

The active time period 520 can be further divided into a plurality of time slots, each of which may be one of an uplink time period 524 or a downlink time period 522 as illustrated in FIG. 5B. During the downlink time period 522, the external electronic device 210 can transmit a video frame to the HMD. During the uplink time period 524, the HMD 200 can transmit information indicative of a user movement to the external device 210.

Figure 5C:
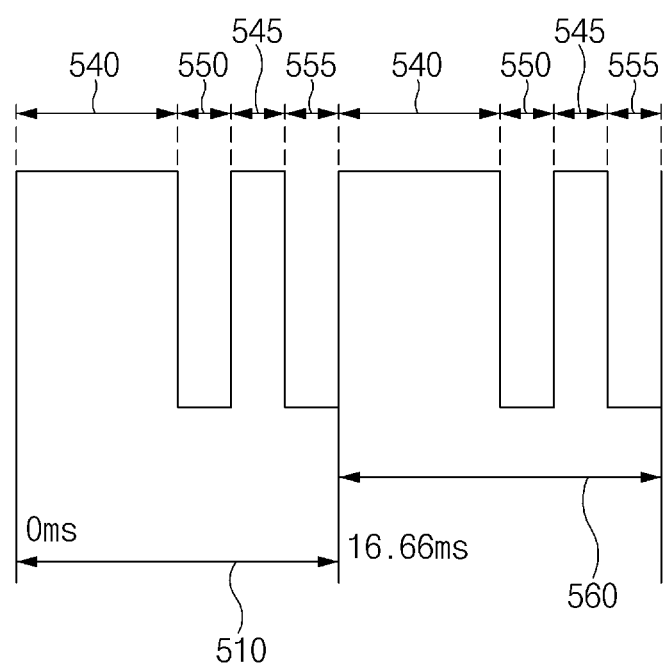

FIG. 5C illustrates data communication time periods 510, 560 with more than one active time periods 540 and 545, and more than one sleep time periods 550 and 555.

FIGS. 5A to 5C illustrate a low-power communication method of an HMD according to certain embodiments. According to an embodiment, the HMD (e.g., 200 in FIG. 2) may transmit or receive data with an external electronic device (e.g., 210 in FIG. 2) through a communication channel (e.g., 230 in FIG. 2). For example, the communication channel 230 may be a short-range wireless network communication by using a WiFi wireless tethering method. The processor 300 of the HMD 200 may perform data communication in various methods to reduce power consumption of the HMD 200.

The communication channel 230 may be referred to as "WiFi communication" to which a target wake time (TWT) mode is applied. It may be understood that the TWT mode is a power saving mode applicable to the next-generation wireless LAN (e.g., IEEE 802.11ax). It may be understood that the communication channel 230 is a peer-to-peer communication between the external electronic device 210 and the HMD 200 and the TWT mode of FIGS. 5A to 5C defined by a next-generation wireless LAN method (e.g., IEEE 802.11ax) is applied to the peer-to-peer communication.

The TWT mode may be started at a request of the HMD 200. Alternatively, the external electronic device 210 may make a request for a TWT operation to the HMD 200. The HMD 200 and the external electronic device 210 may perform an individual TWT agreement. In an agreement process, the HMD 200 and the external electronic device 210 may exchange information about a data communication time period 510, 560 with each other, wherein the data communication time period 510, 560 comprises an active time period 520 and a sleep time period 530. That is, the HMD 200 and the external electronic device 210 may share one of a first sleep time and/or an active start time in the agreement process. The HMD 200 may receive a trigger frame from the external electronic device 210 after a sleep time, and the wireless communication circuit (e.g., 310 of FIG. 3) of the HMD 200 may transition to an active state.

The processor (e.g., 300 in FIG. 3) of the HMD 200 may perform an operation of exchanging data with the external electronic device 210 by using the wireless communication circuit 310. When the active time period 520) is terminated, the wireless communication circuit 310 may enter a sleep state again. The duration of the data communication time period may be determined in advance during the individual TWT agreement process. Alternatively, next data communication time period may be determined through information exchange in the active time period. The above-described operation in the TWT mode of the HMD 200 may be substantially performed by the processor 300 of the HMD 200. The HMD 200 may operate in the TWT mode, thereby reducing power consumption of a battery (e.g., 350 in FIG. 3).

Referring to FIG. 5A, the wireless communication circuit 310 of the HMD 200 may operate in an active state in the data transmission/reception time period (e.g., the active time period 520). When the wireless communication circuit 310 is in the active state, the processor 300 may transmit or receive data with the communication channel 230 through the external electronic device 210. When a specified time elapses, the wireless communication circuit 310 may transition to a sleep state. It may be understood that the sleep state is a state in which low power is supplied to a wireless communication circuit (e.g., the wireless communication circuit 310 of FIG. 3) of the HMD 200 or power is not supplied to the wireless communication circuit. In certain embodiments, the HMD 200 in the sleep state consumes less than 50% of the power consumed during the fully active operation.

When the wireless communication circuit 310 is in the sleep state, the processor 300 may not perform data communication. In certain embodiments, the HMD 200 in the sleep state may not perform data communication using the wireless communication circuit 310, but may operate the display 340, speakers, and sensor circuit 330, or any combination thereof. The processor 300 may determine a data communication period through an individual TWT agreement with the external electronic device 210 based on a frame rate and/or service type of content. For example, the data communication period is referred to as a period in which, after the wireless communication circuit 310 operates in an active state and then a specified active time (e.g., the active time period 520) elapses, the wireless communication circuit 310 transitions to a sleep state and then transitions to an active state again after a specified sleep time (e.g., a sleep time period 530) elapses. The processor 300 may set the data communication time period to the frame rate of content. In this case, during a time period corresponding to one period (e.g., a first time period 510 in FIG. 5A) of the data communication time period, the processor 300 may exchange data associated with one frame of content with the external electronic device 210. For example, one frame may mean one frame of image content. When the HMD 200 provides different pieces of image content to both eyes of a user, one frame may mean one frame of image content corresponding to each of the left and right eyes.

According to an embodiment, the processor 300 may set the duration of the data communication time period to the frame rate of content. It may be understood that the duration of the first time period 510 is a time corresponding to one period of the data communication time period. The processor 300 may exchange data associated with one frame of content with the external electronic device 210 through the wireless communication circuit 310 during the first time period 510. The wireless communication circuit 310 may operate in an active state in only a part of time periods of the first time period 510. For example, the wireless communication circuit 310 may be in an active state in the active time period 520. In the active time period 520, the processor 300 may perform data communication with the external electronic device 210 by using the wireless communication circuit 310. The wireless communication circuit 310 may transition to a sleep state in the sleep time period 530.

For example, when the content has 60 frames per second (FPS), the frame rate of content is about 16.66 ms (¹⁄₆₀ sec), and the data communication period 510 may be determined as 16.66 ms. The HMD 200 and the external electronic device 210 may transmit or receive data corresponding to one frame of content for 16.66 ms. Accordingly, the length of the first time period 510 may be 16.66 ms. For example, the processor 300 may determine the duration time of the active time period 520 to be within 8 ms. When the sleep time period 530 of the first time period 510 elapses and then the wireless communication circuit 310 enters a second time period 560, the wireless communication circuit 310 may transition to an active state again.

The processor 300 may determine the duration of the active time period 520 through the individual TWT agreement with the external electronic device 210, based on the quality of service (QoS) of the WiFi channel.

The duration of the active time period 520 may be determined based on at least one of a state of the communication channel 230 or a content bitrate. The state of the communication channel 230 may be determined based on whether a data packet transmitted through the communication channel 230 is corrupted or an error occurs. When a data corruption rate or an error rate is high, the processor 300 may determine the duration of the active time period 520 to be relatively long, by determining that the state of the communication channel 230 is unstable. A minimum throughput required for the processor 300 may vary depending on the bitrate of content. For example, as the bitrate of content is high, a minimum required throughput may be high. The processor 300 may determine the duration of the active time period 520 based on the bitrate of content and the minimum requested throughput. For example, in the case where the minimum required throughput is high, when the duration of the active time period 520 is too short, the processor 300 may fail to transmit or receive all data associated with content during the active time period 520. In this case, the processor 300 may make the duration of the active time period 520 longer. The descriptions about a bitrate of content, a duration of the active time period 520, and a minimum throughput may be referenced by the description of FIG. 6.

As shown in FIG. 5A, the processor 300 of the HMD 200 may perform data communication with the external electronic device 210 in the active time period 520 and may not perform data communication in the sleep time period 530. However, unlike illustration in FIG. 5A, data communication between the HMD 200 and the external electronic device 210 may be performed in various methods.

Referring to FIG. 5B, FIG. 5B is an enlarged diagram of the first time period 510 and the second time period 560 of FIG. 5A. The active time period 520 may be divided into a plurality of slots. Each slot of the active time period 520 may be one of a downlink time period 522 or an uplink time period 524. In this case, the processor 300 may receive information about how each slot is determined, from the external electronic device 210 through the wireless communication circuit 310 before data communication is started. The wireless communication circuit 310 may operate in an active state in the downlink time period 522 and the uplink time period 524. The processor 300 may perform data communication with the external electronic device 210, by using the wireless communication circuit 310 in the downlink time period 522 and the uplink time period 524. The processor 300 may receive data associated with content from the external electronic device 210 in the downlink time period 522.

For example, the processor 300 may receive data associated with an image to be displayed on a display (e.g., 340 of FIG. 3), a feedback on a user's movement, and/or an indicator associated with a real environment, from the external electronic device 210. The processor 300 may transmit data indicative of an output of the sensor circuit 330 that is associated with content to the external electronic device 210 in the uplink time period 524. For example, the processor 300 may transmit, to the external electronic device 210, data associated with a direction in which the user wearing the HMD 200 faces, a movement direction of the user, an image obtained by using a camera (e.g., 320 in FIG. 3), and/or the user's state detected by using a sensor circuit (e.g., 330 of FIG. 3). As another example, when an auxiliary device (e.g., a controller) for manipulating content is used together with the HMD 200, the processor 300 may transmit information associated with the auxiliary device for manipulating content, to the external electronic device 210 by using the wireless communication circuit 310. In an embodiment, the amount of data received by the HMD 200 from the external electronic device 210 may be greater than the amount of data transmitted by the HMD 200 to the external electronic device 210. In this case, a time period allocated to a downlink in the active time period 520 may be longer than a time period allocated to an uplink in the active time period 520. The allocation and time period length of a downlink or uplink slot of FIG. 5B are examples, and an embodiment of the disclosure is not limited thereto.

Referring to FIG. 5C, the wireless communication circuit 310 may operate in an active state in a first active time period 540 of the first time period 510 and then may transition to a sleep state in a first sleep time period 550. After the first sleep time period 550 elapses, the wireless communication circuit 310 may transition to an active state again in a second active time period 545. The processor 300 may perform data communication with the external electronic device 210 in the second active time period 545. After the second active time period 545 elapses, the wireless communication circuit 310 may transition to a sleep state again in a second sleep time period 555.

According to an embodiment, in the first active time period 540 and the second active time period 545, the HMD 200 or the external electronic device 210 may transmit data. For example, in the first active time period 540, the HMD 200 may transmit data to the external electronic device 210; and in the second active time period 545, the external electronic device 210 may transmit data to the HMD 200. As another example, in the first active time period 540, the external electronic device 210 may transmit data to the HMD 200; and, in the second active time period 545, the HMD 200 may transmit data to the external electronic device 210. In addition, as another example, in the first active time period 540 and the second active time period 545 of the first time period 510, the HMD 200 may transmit data to the external electronic device 210; and, in the first active time period 540 and the second active time period 545 of the second time period 560, the external electronic device 210 may transmit data to the HMD 200.

The number of active time periods and the number of sleep time periods in FIG. 5C are examples, and an embodiment of the disclosure is not limited thereto. For example, in the first time period 510, the wireless communication circuit 310 may transition to an active state twice or more.

A frame rate of content, a data communication period, a duration of an active time period, and/or the number of active time periods in FIGS. 5A to 5C is example, and is not limited by an embodiment of the disclosure.

According to an embodiment, the HMD 200 may include the wireless communication circuit 310 and the at least one processor 300 operatively connected to the wireless communication circuit 310. The at least one processor 300 may be configured to establish the communication channel 230 with the external electronic device 210 by using the wireless communication circuit 310, to determine a data communication period and a length of the active time period 520 based on a frame rate of content, to cause the wireless communication circuit 310 to transition to an active state in the active time period 520, to perform data communication with the external electronic device 210 through the communication channel 230 in the active time period 520, and to cause the wireless communication circuit 310 to transition to a sleep state in the sleep time period 530. The at least one processor 300 may be further configured to receive data from the external electronic device 210 in the active time period 520 and, after causing the wireless communication circuit 310 to transition to an active state in at least a partial time period in the sleep time period 530, to transmit data to the external electronic device 210 through the communication channel 230. The at least one processor 300 may be further configured to determine a duration of the active time period 520 based on at least one of a state of the communication channel 230 or a bitrate of the content.

According to an embodiment, the active time period 520 may be composed of a plurality of slots. The at least one processor 300 may be further configured to perform individual target wake time (TWT) agreement with the external electronic device 210 on the plurality of slots. The at least one processor 300 may be further configured to determine whether each of the plurality of slots is an uplink or a downlink, based on the individual TWT agreement.

According to an embodiment, the at least one processor 300 may be further configured to determine a duration of the active time period 520 based on quality of service (QoS) of the communication channel 230.

According to an embodiment, the communication channel 230 may be wireless communication in a WiFi wireless tethering scheme.

According to an embodiment, the HMD 200 may further include the battery 350. The at least one processor 300 may be configured to cause the battery 350 to be charged when the HMD 200 is mounted in a case of the external electronic device 210 and the battery 350 is electrically connected to a charging terminal of the external electronic device 210.

FIG. 6 is a table obtained by measuring power consumption of an HMD using low-power wireless communication, according to certain embodiments.

Table 1 600 is a table obtained by measuring power consumption when a HMD (e.g., 200 in FIG. 2) receives data; and Table 2 650 is a table obtained by measuring power consumption when the HMD 200 transmits data.

Table 1 600 shows power consumption in a case where the HMD 200 receives data associated with content of 60 FPS from an external electronic device (e.g., 210 of FIG. 2) at a data communication time period of 16.66 ms (510, 560). The column headers in Table 1 600 are the duration of the active time period (e.g., 520 in FIG. 5A) and percentage of the active time period to the data communication time period. The row headers in Table 1 600 are different bitrates of content received by the HMD 200. In Table 1 600, it may be assumed that the HMD 200 only receives data from the external electronic device 210 in the active time period 520.

Referring to Table 1 600, in the case of content of 10 Mbps, a wireless communication circuit (e.g., 310 of FIG. 3) of the HMD 200 may operate in an active state for 16 ms (e.g., the active time period 520). A processor (e.g., 300 in FIG. 3) may receive data associated with content from the external electronic device 210 for 16 ms by using the wireless communication circuit 310. In this case, the HMD 200 may receive data associated with content by consuming power of 243 mW. As the active time period 520 of the wireless communication circuit 310 becomes short, a minimum throughput required for the processor 300 may increase, but power consumption may decrease. For example, referring to Table 1 600, when the active time period 520 of the wireless communication circuit 310 has 1 ms, the minimum required throughput for the processor 300 may be about 166.7 Mbps, and the power consumption may be 15 mW. Accordingly, as compared to a case where the active time period 520 has 16 ms, the wireless communication circuit 310 may reduce power consumption of the HMD 200 by about 93% by using low-power wireless communication (e.g., the wireless communication circuit 310 operates in an active state for 1 ms). The processor 300 may identify a condition (e.g., QoS) of the external electronic device 210 to increase throughput, and thus, may change the data transmission rate by changing settings of a communication channel (e.g., 230 in FIG. 2). To increase a throughput of data received by the HMD 200, the external electronic device 210 may change WiFi communication settings. For example, to increase a data transmission throughput, the external electronic device 210 may adjust a coding rate on a modulation coding scheme (MCS) or may change a modulation type. In addition, the external electronic device 210 may increase the data transmission throughput by increasing the number of spatial streams of multiple input multiple output (MIMO) or reducing a guard interval. According to certain embodiments, the external electronic device 210 may increase the data transmission throughput by increasing a data transmission rate or increasing a frequency band (e.g., channel bonding).

After the active time period 520 elapses, the wireless communication circuit 310 may transition to a sleep state (e.g., the sleep time period 530 of FIG. 5A). The wireless communication circuit 310 may not consume power for data communication in the sleep time period 530, and thus power consumption may decrease as the active time period 520 is short. Also, shortening the active time period 520 rather than increasing a throughput may further reduce power consumption. For example, when the active time period 520 has 16 ms, even though data associated with content is received (consuming power of 243 mW) at 10 Mbps and then is received (425 mW) at 1 Gbps after a data throughput is increased to 1 Gbps, the reduction in power consumption is about 42.8%, and thus restricting the active time period 520 may be more advantageous in reducing power consumption.

Continuously referring to Table 1 600, in the case of content of 50 Mbps, the wireless communication circuit 310 of the HMD 200 may operate in an active state for 16 ms (e.g., the active time period 520). The processor 300 may receive data associated with content from the external electronic device 210 by using the wireless communication circuit 310 for 16 ms. The HMD 200 may receive data by consuming power of 234 mW. On the other hand, when the active time period 520 of the wireless communication circuit 310 has 1 ms, the HMD 200 may receive data by consuming power of 27 mW. As compared to a case where the active time period 520 has 16 ms, the wireless communication circuit 310 may reduce power consumption by about 88% by using low-power wireless communication (e.g., maintaining an active state for 1 ms).

In the case of content of 100 Mbps, the HMD 200 may consume power of 234 mW when the active time period 520 of the wireless communication circuit 310 has about 16 ms, but the HMD 200 may consume power of 53 mW when the active time period 520 has 2 ms. In this case, the wireless communication circuit 310 may reduce power consumption of the HMD 200 by about 77% by using low-power wireless communication (e.g., maintaining an active state for 2 ms). When the active time period 520 has 1 ms, a higher throughput may be required for the processor 300 than a throughput in a case where the active time period 520 has 2 ms. For example, when the active time period 520 has 1 ms, the processor 300 may need to receive data at twice a rate in a case where the active time period 520 has 2 ms. However, in a WiFi wireless tethering environment, in the case of content of 100 Mbps, because it is impossible to perform communication on data at twice a rate in a case where the active time period 520 has 2 ms, a portion corresponding to 1 ms in Table 1 600 may be displayed as N/A (there is no corresponding value).

In the case of content of 500 Mbps, the HMD 200 may consume power of 274 mW when the active time period 520 of the wireless communication circuit 310 has about 16 ms, but the HMD 200 may consume power of 213 mW when the active time period 520 has 8 ms. In this case, the wireless communication circuit 310 may reduce power consumption of the HMD 200 by about 22% by using low-power wireless communication (e.g., maintaining an active state for 8 ms). When the active time period 520 has 4 ms, a higher throughput may be required for the processor 300 than a throughput in a case where the active time period 520 has 8 ms. For example, when the active time period 520 has 4 ms, the processor 300 may need to receive data at twice a rate in a case where the active time period 520 has 8 ms. However, in a WiFi wireless tethering environment, in the case of content of 500 Mbps, because it is impossible to perform communication on data at twice a rate in a case where the active time period 520 has 8 ms, a portion corresponding to a time period less than 8 ms in Table 1 600 may be displayed as N/A (there is no corresponding value).

In a case of content of 1 Gbps, the processor 300 may not perform communication on data at a faster rate in a WiFi wireless tethering environment, and thus only the power consumption may be known in a case where the active time period 520 of the wireless communication circuit 310 has about 16 ms. In a case where content of 2 Gbps, the processor 300 may not receive all data associated with content of 2 Gbps for 16 ms by using WiFi wireless tethering, and thus power consumption may not be measured.

Table 2 650 shows power consumption in a case where the HMD 200 transmits data associated with content of 60 FPS from the external electronic device 210 at a period of 16.66 ms. A horizontal axis in Table 2 650 is a duration of the active time period 520; and a vertical axis in Table 2 650 is a bitrate of content transmitted by the HMD 200. In Table 2 650, it may be understood that the HMD 200 only transmits data to the external electronic device 210 in the active time period 520.

Referring to Table 2 650, in the case of content of 10 Mbps, a wireless communication circuit (e.g., 310 of FIG. 3) may operate in an active state for about 16 ms (e.g., the active time period 520). The processor 300 may transmit data associated with content to the external electronic device 210 by using the wireless communication circuit 310 for 16 ms. In this case, the HMD 200 may transmit data associated with content by consuming power of 905 mW. As the active time period 520 of the wireless communication circuit 310 becomes short, a minimum throughput required for the processor 300 may increase, but power consumption may decrease. For example, referring to Table 2 650, when the active time period 520 of the wireless communication circuit 310 has 1 ms, the minimum required throughput for the processor 300 may be about 166.7 Mbps, and the power consumption may be 57 mW. Accordingly, the wireless communication circuit 310 may reduce power consumption of the HMD 200 by about 93% by using low-power wireless communication (e.g., the wireless communication circuit 310 operates in an active state for 1 ms). To increase a data transmission throughput, the processor 300 may adjust a coding rate on an MCS or may change a modulation type. In addition, the processor 300 may increase the data transmission throughput by increasing the number of spatial streams of multiple input multiple output (MIMO) or reducing a guard interval. According to certain embodiments, the processor 300 may increase the data transmission throughput by increasing a data transmission rate or increasing a frequency band (e.g., channel bonding). After the active time period 520 elapses, the wireless communication circuit 310 may transition to a sleep state. The wireless communication circuit 310 may not consume power for data communication in the sleep time period (e.g., 530 of FIG. 5A), and thus power consumption may decrease as the active time period 520 is short. Also, shortening the active time period 520 rather than increasing a throughput may further reduce power consumption. For example, when the active time period 520 has 16 ms, even though data associated with content is transmitted (consuming power of 905 mW) at 10 Mbps and then is transmitted (1545 mW) at 1 Gbps after a data throughput is increased to 1 Gbps, the reduction in power consumption is about 41.4%, and thus restricting the active time period 520 may be more advantageous in reducing power consumption.

Continuously referring to Table 2 650, in the case of content of 50 Mbps, a wireless communication circuit 310 of the HMD 200 may operate in an active state for 16 ms (e.g., the active time period 520). The processor 300 may transmit data associated with content to the external electronic device 210 by using the wireless communication circuit 310 for 16 ms. The HMD 200 may transmit data by consuming power of 905 mW. On the other hand, when the active time period 520 of the wireless communication circuit 310 has 1 ms, the HMD 200 may transmit data by consuming power of 97 mW. As compared to a case where the active time period 520 has 16 ms, the wireless communication circuit 310 may reduce power consumption by about 89% by using low-power wireless communication (e.g., maintaining an active state for 1 ms).

In the case of content of 100 Mbps, the HMD 200 may consume power of 905 mW when the active time period 520 of the wireless communication circuit 310 has about 16 ms, but the HMD 200 may consume power of 193 mW when the active time period 520 has 2 ms. In this case, the wireless communication circuit 310 may reduce power consumption of the HMD 200 by about 78% by using low-power wireless communication (e.g., maintaining an active state for 2 ms). When the active time period 520 has 1 ms, a higher throughput may be required for the processor 300 than a throughput in a case where the active time period 520 has 2 ms. For example, when the active time period 520 has 1 ms, the processor 300 may need to transmit data at twice a rate in a case where the active time period 520 has 2 ms. However, in a WiFi wireless tethering environment, in the case where content data of 100 Mbps is transmitted, because it is impossible to perform communication on data at twice a rate in a case where the active time period 520 has 2 ms, a portion corresponding to 1 ms in Table 1 650 may be displayed as N/A (there is no corresponding value).

In the case of content of 500 Mbps, the HMD 200 may consume power of 905 mW when the active time period 520 of the wireless communication circuit 310 has about 16 ms, but the HMD 200 may consume power of 772 mW when the active time period 520 has 8 ms. In this case, the wireless communication circuit 310 may reduce power consumption of the HMD 200 by about 15% by using low-power wireless communication (e.g., maintaining an active state for 8 ms). When the active time period 520 has 4 ms, a higher throughput may be required for the processor 300 than a throughput in a case where the active time period 520 has 8 ms. For example, when the active time period 520 has 4 ms, the processor 300 may need to transmit data at twice a rate in a case where the active time period 520 has 8 ms. However, in a WiFi wireless tethering environment, in the case where content data of 500 Mbps is transmitted, because it is impossible to perform communication on data at twice a rate in a case where the active time period 520 has 8 ms, a portion corresponding to a time period less than 8 ms in Table 2 650 may be displayed as N/A (there is no corresponding value).

In a case of content of 1 Gbps, the processor 300 may not perform communication on data at a faster rate in a WiFi wireless tethering environment, and thus only the power consumption may be known in a case where the active time period 520 of the wireless communication circuit 310 has about 16 ms. In a case where content of 2 Gbps, the processor 300 may not transmit all data associated with content of 2 Gbps for 16 ms by using WiFi wireless tethering, and thus power consumption may not be measured.

Table 1 600 and Table 2 650 in FIG. 6 may be embodiments of the disclosure. When faster speed is supported in a WiFi wireless tethering environment, the minimum required throughput and/or the active time period 520 may be changed.

Figure 7:
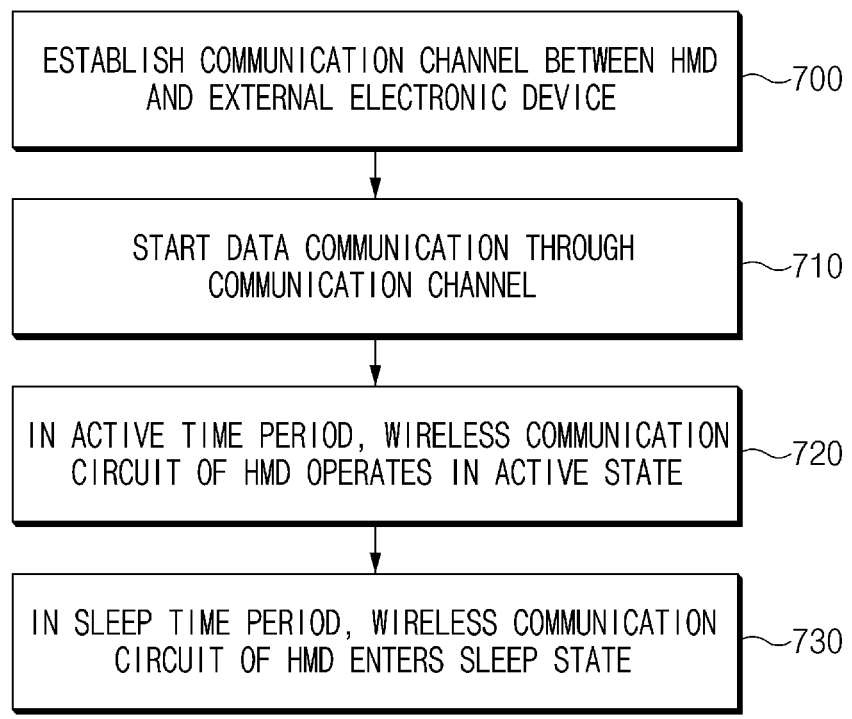
FIG. 7 is a flowchart illustrating that an HMD communicates with an external electronic device by using low-power wireless communication, according to certain embodiments.

FIG. 7 is a flowchart illustrating that an HMD communicates with an external electronic device by using low-power wireless communication, according to certain embodiments. The description of FIG. 7 may be referenced by the description of FIGS. 1 to 6.

Referring to operation 700, a HMD (e.g., 200 of FIG. 2) may establish a communication channel (e.g., 230 of FIG. 2) with an external electronic device (e.g., 210 of FIG. 2). The communication channel 230 may be a short-range wireless network using a WiFi communication method (e.g., WiFi wireless tethering). The communication channel 230 may perform communication on a large amount of data. However, it may be understood that the communication channel 230 is a communication method capable of causing large power consumption of an electronic device.

In operation 710, a processor (e.g., 300 of FIG. 3) of the HMD 200 may perform communication with the external electronic device 210 on data associated with content through the communication channel 230 by using a wireless communication circuit (e.g., 310 of FIG. 3). During data communication with the external electronic device 210, the HMD 200 may communicate in a TWT mode to reduce power consumption. For example, the HMD 200 may share one of a first sleep time or an active start time in an agreement process (e.g., individual TWT agreement) with the external electronic device 210. According to an agreement, the HMD 200 may receive a trigger frame from the external electronic device 210 after a sleep time, and the wireless communication circuit (e.g., 310 of FIG. 3) of the HMD 200 may transition to an active state. The wireless communication circuit (e.g., 310 of FIG. 3) of the HMD 200 may operate in an active state only during the agreed time and period. For example, the wireless communication circuit (e.g., 310 of FIG. 3) of the HMD 200 operates in an active state only when transmitting or receiving data, and may transition to a sleep state in the remaining time periods. The processor 300 may perform data communication with the external electronic device 210, by using the wireless communication circuit 310 in an active time period (e.g., 520 of FIG. 5A). The processor 300 may reduce power consumption of the HMD 200 for data communication by controlling the wireless communication circuit (e.g., 310 of FIG. 3) not to perform data communication in a sleep time period (e.g., 530 of FIG. 5A). According to an embodiment, the processor 300 may receive information about a data communication method from the external electronic device 210 before transmitting or receiving data. For example, the processor 300 may receive, from the external electronic device 210, information about a data communication period, a length of the active time period 520, and/or a time to transition to a sleep state. The data communication period may be determined based on the type of content (e.g., a frame rate) and/or a service type. The service type may be based on the type of an application running on the HMD 200 and/or the external electronic device 210. As another example, when the active time period (e.g., 520 of FIG. 5A) is composed of a plurality of slots, the processor 300 may receive, from the external electronic device 210, information for determining whether each slot is an uplink or a downlink. According to another embodiment, when it is necessary to transmit data associated with content, the processor 300 may receive, from the external electronic device 210, information associated with a TWT mode (e.g., information about a data communication period, a length of the active time period 520, and/or a time to transition to a sleep state).

In operation 720, the wireless communication circuit 310 may operate in an active state in the active time period 520. According to an embodiment, the processor 300 may determine the data communication period based on a frame rate of content. For example, the processor 300 may set the frame rate of content as the data communication period, and may exchange data for one frame of content with the external electronic device 210 during a time period (e.g., the active time period 520 of FIG. 5A) corresponding to the data communication period. For example, when the content has 60 FPS, the frame rate of content is about 16.66 ms, and the data communication period may be determined as 16.66 ms. The HMD 200 and the external electronic device 210 may exchange data for 60 frames for 1 second with each other, and may complete data communication for one frame within 16.66 ms. According to an embodiment, the wireless communication circuit 310 may operate in an active state in the active time period 520. The processor 300 may perform data communication with the external electronic device 210 by using the wireless communication circuit 310. For example, a duration of the active time period 520 may be determined within 8 ms. The length of the active time period 520 may be determined based on QoS of a WiFi channel. The description of a frame rate of content is an example, and an embodiment of the disclosure is not limited thereto. For example, when the frame rate of content is 45 FPS, the data communication period may be determined as 22.2 ms; when the frame rate of content is 95 FPS, the data communication period may be determined as 10.5 ms. Also, when the frame rate of content in data communication is changed, the processor 300 may change the data communication period and the length of the active time period 520 accordingly.

In operation 730, the wireless communication circuit 310 may transition to a sleep state in the sleep time period 530. The wireless communication circuit 310 may not consume power for data communication in a sleep state or may reduce power consumption less than power consumption in an active state. For convenience of description, operation 720 and operation 730 are shown to be sequentially performed once. However, operation 720 and/or operation 730 may be performed a plurality of times when the processor 300 repeats an operation of communicating in an active state, transitioning to a sleep state, and then again transitioning to the active state, during the time period 510 corresponding to the data communication period.

According to an embodiment, the wireless communication circuit 310 may repeat an active state and a sleep state at a specified period. For example, when the wireless communication circuit 310 transitions to a sleep state after operating in an active state in the first time period (e.g., 510 in FIG. 5A), the wireless communication circuit 310 may transition to an active state when the second time period (e.g., 560 of FIG. 5A) is started. The processor 300 may perform data communication on the next frame during the active time period 520 of the second time time period 560 by using the wireless communication circuit 310.

According to an embodiment, an operating method of an electronic device (e.g., the HMD 200) may include establishing the communication channel 230 with the external electronic device 210 by using the wireless communication circuit 310, determining a data communication period and a length of the active time period 520 based on a frame rate of content, causing the wireless communication circuit 310 to transition to an active state in the active time period 520, performing data communication with the external electronic device 210 through the communication channel 230 in the active time period 520, and causing the wireless communication circuit 310 to transition to a sleep state in the sleep time period 530.

According to an embodiment, the operating method of the electronic device (e.g., the HMD 200) may further include receiving data from the external electronic device 210 in the active time period 520 and transmitting data to the external electronic device 210 through the communication channel 230 after causing the wireless communication circuit 310 to transition to the active state in at least a partial time period in the sleep time period 530.

According to an embodiment, the operating method of the electronic device (e.g., the HMD 200) may further include determining a duration of the active time period 520 based on at least one of a communication channel state or a bitrate of the content. According to an embodiment, the active time period 520 may be composed of a plurality of slots. The operating method of the electronic device (e.g., the HMD 200) may further include performing individual TWT agreement with the external electronic device 210 on the plurality of slots.

According to an embodiment, the operating method of the electronic device (e.g., the HMD 200) may further include determining whether each of the plurality of slots is an uplink or a downlink, based on the individual TWT agreement with the external electronic device 210.

According to an embodiment, the operating method of the electronic device (e.g., the HMD 200) may further include determining a duration of the active time period 520 based on QoS of the communication channel 230. According to an embodiment, the communication channel 230 between the electronic device (e.g., the HMD 200) and the external electronic device 210 is wireless communication in a WiFi wireless tethering scheme.

According to an embodiment, the electronic device may include the battery 350. The operating method of the electronic device (e.g., the HMD 200) may further include causing the battery 350 to be charged when the electronic device (e.g., the HMD 200) is mounted in a case of the external electronic device 210 and the battery 350 is electrically connected to a charging terminal of the external electronic device 210.

According to an embodiment, a computer-readable recording medium storing at least one or more instructions, when executed by at least one processor (e.g., the processor 300), may cause the at least one processor to perform establishing the communication channel 230 with the external electronic device 210 by using the wireless communication circuit 310, determining a data communication period and a length of an active time period 520 based on a frame rate of content, causing the wireless communication circuit 310 to transition to an active state in the active time period 520, performing data communication with the external electronic device 210 through the communication channel 230 in the active time period 520, and causing the wireless communication circuit 310 to transition to a sleep state in the sleep time period 520.

According to an embodiment, the computer-readable recording medium storing at least one or more instructions, when executed by at least one processor (e.g., the processor 300), may cause the at least one processor to further perform receiving data from the external electronic device 210 in the active time period 520 and transmitting data to the external electronic device 210 through the communication channel 230 after causing the wireless communication circuit 310 to transition to the active state in at least a partial time period in the sleep time period 530.

According to an embodiment, the computer-readable recording medium storing at least one or more instructions, when executed by at least one processor (e.g., the processor 300), may cause the at least one processor to further perform determining a duration of the active time period 520 based on at least one of a state of the communication channel 230 or a bitrate of the content. According to an embodiment, the communication channel 230 may be a WiFi wireless tethering scheme.

According to certain embodiments disclosed in the specification, it is possible to reduce the power consumption of an electronic device, by providing a method in which the electronic device exchanges large amounts of data with an external electronic device at low power.

Besides, a variety of effects directly or indirectly understood through the specification may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
a wireless communication circuit; and
at least one processor operatively connected to the wireless communication circuit,
wherein the at least one processor is configured to:
establish a communication channel with an external electronic device by using the wireless communication circuit;
determine a duration of data communication time periods based on a video frame rate of content, wherein the data communication time periods comprise respective active time periods and respective sleep time periods, and wherein the respective active time periods comprise respective uplink periods and respective downlink periods;
control the wireless communication circuit to enter an active state during the respective active time periods;
communicate data with the external electronic device through the communication channel during the respective active time periods, wherein communicating data further comprises:
transmitting information indicative of user movement during each of the respective uplink periods, and
receiving video frames during each of the respective downlink periods, wherein the video frames transmitted during each of the respective downlink periods is based at least in part on the user movement from at least one uplink period occurring prior to the respective downlink periods; and
control the wireless communication circuit to enter a sleep state during the respective sleep time periods.

2. The electronic device of claim 1, wherein the at least one processor is further configured to:
receive data from the external electronic device during the respective active time periods; and
after transiting the wireless communication circuit to the active state during at least a part of the respective sleep time periods, transmit data to the external electronic device through the communication channel.

3. The electronic device of claim 1, wherein the at least one processor is further configured to:
determine a duration of time for the respective active time periods based on at least one of a communication channel state or a bitrate of the content.

4. The electronic device of claim 1, wherein the respective active time periods comprise a plurality of slots,
wherein the at least one processor is further configured to:
make an individual target wake time (TWT) agreement with the external electronic device regarding the plurality of slots.

5. The electronic device of claim 4, wherein the at least one processor is further configured to:
determine whether each of the plurality of slots is an uplink time period or a downlink time period, based on the individual TWT agreement.

6. The electronic device of claim 1, wherein the at least one processor is further configured to:
determine a duration of the respective active time periods based on a quality of service (QoS) of the communication channel.

7. The electronic device of claim 1, wherein the communication channel is wireless communication in a WiFi wireless tethering scheme.

8. The electronic device of claim 1, further comprising:
a battery operatively connected to the at least one processor,
wherein the at least one processor is further configured to:
when the electronic device is mounted in a case of the external electronic device and the battery is electrically connected to a charging terminal of the external electronic device, cause the battery to be charged.

9. An operating method of an electronic device, the method comprising:
establishing a communication channel with an external electronic device using a wireless communication circuit;
determining a duration of data communication time periods based on a video frame rate of a content, wherein the data communication time periods comprise respective active time periods and respective sleep time periods, and wherein each respective active time period comprises respective uplink periods and respective downlink periods;
controlling the wireless communication circuit to enter an active state in the respective active time periods;
communicating data with the external electronic device through the communication channel in the respective active time periods, wherein communicating data further comprises:
transmitting information indicative of user movement during each of the respective uplink periods, and
receiving video frames during each of the respective downlink periods, wherein the video frames transmitted during each of the respective downlink periods is based at least in part on the user movement from at least one uplink period occurring prior to the respective downlink periods; and
controlling the wireless communication circuit to enter a sleep state during the respective sleep time periods.

10. The method of claim 9, further comprising:
receiving data from the external electronic device during the respective active time periods; and
after transiting the wireless communication circuit to the active state during at least a part of the respective sleep time periods, transmitting data to the external electronic device through the communication channel.

11. The method of claim 9, further comprising:
determining a duration of time for the respective active time periods based on at least one of a communication channel state or a bitrate of the content.

12. The method of claim 9, wherein the respective active time periods comprise a plurality of slots,
the method further comprising:
making an individual TWT agreement with the external electronic device regarding the plurality of slots.

13. The method of claim 12, further comprising:
determining whether each of the plurality of slots is an uplink time period or a downlink time period, based on the individual TWT agreement.

14. The method of claim 9, further comprising:
determining a duration of the respective active time periods based on QoS of the communication channel.

15. The method of claim 9, wherein the communication channel is wireless communication in a WiFi wireless tethering scheme.

16. The method of claim 9, wherein the electronic device includes a battery,
the method further comprising:
when the electronic device is mounted in a case of the external electronic device and the battery is electrically connected to a charging terminal of the external electronic device, causing the battery to be charged.

17. A non-transitory computer-readable recording medium storing at least one or more instructions, when executed by at least one processor, causing the at least one processor to perform:
establishing a communication channel with an external electronic device by using a wireless communication circuit;
determining a duration of data communication time periods based on a video frame rate of a content, wherein the data communication time periods comprise respective active time periods and respective sleep time periods, and wherein the respective active time periods comprise respective uplink periods and respective downlink periods;
controlling the wireless communication circuit to enter an active state in the respective active time periods;
communicating data with the external electronic device through the communication channel in the respective active time periods, wherein communicating data further comprises:
transmitting information indicative of user movement during each of the respective uplink periods, and
receiving video frames during each of the respective downlink periods, wherein the video frames transmitted during each of the respective downlink periods is based at least in part on the user movement from at least one uplink period occurring prior to the respective downlink periods; and
controlling the wireless communication circuit to enter a sleep state during the respective sleep time periods.

18. The non-transitory computer-readable recording medium of claim 17, wherein the at least one or more instructions, when executed by the at least one processor, cause the at least one processor to further perform:
receiving data from the external electronic device in the respective active time periods; and
after transiting the wireless communication circuit to the active state during at least a part of the respective sleep time periods, transmitting data to the external electronic device through the communication channel.

19. The non-transitory computer-readable recording medium of claim 17, the at least one or more instructions, when executed by the at least one processor, cause the at least one processor to further perform:
determining a duration of the respective active time periods based on at least one of a communication channel state or a bitrate of the content.

20. The non-transitory computer-readable recording medium of claim 17, wherein the communication channel is wireless communication in a WiFi wireless tethering scheme.

* * * * *